US008845991B2

(12) United States Patent
Keiser et al.

(10) Patent No.: US 8,845,991 B2
(45) Date of Patent: Sep. 30, 2014

(54) SILICA PARTICLE MANUFACTURING PROCESS

(75) Inventors: Bruce A. Keiser, Plainfield, IL (US); Nicholas S. Ergang, Glen Ellyn, IL (US); Richard Mimna, Aurora, IL (US); Brett M. Showalter, Wheaton, IL (US)

(73) Assignee: Ecolab USA Inc., Naperville, IL (US)

( * ) Notice: Subject to any disclaimer, the term of this patent is extended or adjusted under 35 U.S.C. 154(b) by 769 days.

(21) Appl. No.: 12/756,526

(22) Filed: Apr. 8, 2010

(65) Prior Publication Data

US 2011/0251057 A1 Oct. 13, 2011

(51) Int. Cl.
*C01B 33/12* (2006.01)
*C01B 33/141* (2006.01)
*C01B 33/18* (2006.01)

(52) U.S. Cl.
CPC ............. *C01B 33/18* (2013.01); *C01B 33/1415* (2013.01); *C01P 2006/16* (2013.01); *C01P 2006/14* (2013.01); *C01P 2006/12* (2013.01)
USPC ........................................................ 423/335

(58) Field of Classification Search
CPC .. C01B 33/18; C01B 33/141; C01B 33/1415; C01B 33/1417; C01B 33/149; C01P 2006/12; C01P 2006/14; C01P 2006/16
USPC ................................................ 423/335–340
See application file for complete search history.

(56) References Cited

U.S. PATENT DOCUMENTS

| | | | |
|---|---|---|---|
| 4,272,409 A | 6/1981 | Bergna | |
| 4,927,498 A | 5/1990 | Rushmere | |
| 5,196,177 A | 3/1993 | Watanabe et al. | |
| 5,378,399 A | 1/1995 | Kaliski | |
| 5,503,820 A | 4/1996 | Moffett et al. | |
| 5,980,836 A | 11/1999 | Moffett et al. | |
| 6,060,523 A | 5/2000 | Moffett et al. | |
| 6,077,341 A | 6/2000 | Terase et al. | |
| 6,274,112 B1 | 8/2001 | Moffett et al. | |
| 6,379,500 B2 * | 4/2002 | Greenwood et al. | 162/181.6 |
| 6,500,870 B1 * | 12/2002 | Linsten et al. | 516/81 |
| 2005/0170109 A1 | 8/2005 | Chen et al. | |
| 2006/0078696 A1 | 4/2006 | Furholz et al. | |
| 2006/0099129 A1 * | 5/2006 | Stenzel et al. | 423/335 |
| 2007/0231249 A1 | 10/2007 | Battlo et al. | |
| 2008/0085412 A1 | 4/2008 | Ortiz | |

FOREIGN PATENT DOCUMENTS

GB 1587236 4/1981

OTHER PUBLICATIONS

Hunkeler et al., "Mechanism, Kinetics and Modeling of the Inverse-Microsuspension Homopolymerization of Acrylamide," Polymer, vol. 30, pp. 127-142, 1989.
Hunkeler et al., "Mechanism, Kinetics and Modeling of the Inverse-Microsuspension Polymerization: 2. Copolymerization of Acrylamide with Quaternary Ammonium Cationic Monomers," Polymer, vol. 32, pp. 2626-2640, 1991.

* cited by examiner

*Primary Examiner* — Anthony J Zimmer
(74) *Attorney, Agent, or Firm* — Brinks Gilson & Lione

(57) ABSTRACT

Methods of forming a silica-based products are disclosed. One method comprises: (a) providing a silica containing precursor (SCP) contained in solution that has a pH less than or equal to a pH of 7; (b) optionally doping the SCP with one or more metal species, wherein said doping occurs when the solution has a pH less than or equal to a pH of 7; (c) adjusting the pH of the solution to greater than 7; (d) adding an effective amount of salt to the solution so that the conductivity of the solution is greater than or equal to 4 mS, wherein said addition occurs prior to, simultaneously with, or after the pH adjustment in step 1c; (e) optionally filtering and drying the SCP; and (f) optionally reacting the dried product from step e with a functional group and optionally wherein the resultant functionalized dried product is at least one of the following: a functionalized metal oxide-doped or metal sulfide-doped silica product. Another method comprises: (a) providing a silica containing precursor (SCP) contained in solution that has a pH greater than 7; (b) adjusting the pH of the solution to less than or equal to 7; (c) optionally doping the SCP with one or more metal species, wherein said doping occurs when the solution has a pH less than or equal to a pH of 7; (d) adjusting the pH of the solution to greater than 7; (e) adding an effective amount of salt to the solution so that the conductivity of the solution is greater than or equal to 4 mS, wherein said addition occurs prior to, simultaneously with, or after the pH adjustment in step 2d; (f) optionally filtering and drying the SCP; and (g) optionally reacting the dried product from step f with a functional group and optionally wherein the resultant functionalized dried product is at least one of the following: a functionalized metal oxide-doped or metal sulfide-doped silica product.

20 Claims, No Drawings

SILICA PARTICLE MANUFACTURING PROCESS

FIELD OF THE INVENTION

This disclosure pertains to methods of manufacture for silica containing compositions.

BACKGROUND OF THE INVENTION

Silica containing materials have ubiquitous applications. More specifically, a variety of manufacturing processes that produce either consumer or industrial products utilize silica-containing materials for various purposes. For example, silica-containing products can be utilized as fillers in coatings (e.g. paints) and polymer composites, catalysts supports, beer/wine/juice clarifiers. New methods of manufacture are also desired by the industry.

SUMMARY OF THE INVENTION

The present invention provides for a method of forming a silica-based product comprising: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1 c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica product.

The present invention also provides for a method of forming a silica-based product comprising: a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: a functionalized metal oxide-doped or metal sulfide-doped silica product.

DETAILED DESCRIPTION OF THE INVENTION

Any patents and published applications mentioned in this application are herein incorporated by reference.

As stated above, the silica containing products encompassed by this invention can be made by the following methods.

One methodology involves starting from an acidic starting point.

In one embodiment, the method comprises forming a silica-based product comprising the steps of: a. providing a silica containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica product.

In another embodiment, the functional group in step f is an organosilane.

In another embodiment, the silicon-containing precursor is selected from at least one of the following: silicic acid, colloidal silica, tetraethylorthosilicate, and dispersed fumed silica.

In another embodiment, the pH range of the SCP in step 1(a) is from of 3 to 4.

In another embodiment, the pH of the SCP is adjusted to greater than 7 by mixing said SCP with an alkaline solution at a shear rate of 6 to 23 m/s based on tip speed.

In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica based product.

In another embodiment, the method further comprises adjusting the pH of the SCP to greater than 7 by combining said SCP with an alkaline solution under transitional flow conditions, i.e. Reynolds Numbers between 2000 and 4000, to form the silica based product.

In another embodiment, the method further comprises adjusting the pH of the SCP to greater than 7 by combining said SCP with an alkaline solution under turbulent flow conditions, i.e. Reynolds Numbers greater than or equal to 4000, to form the silica based product.

In another embodiment, the pH of the SCP is adjusted to a pH range of 7 to 11 with the use of a chemistry selected from at least one of the following: ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step d is filtered and dried such that the solid concentration of said dried and filtered product is increased from about 5 wt % to about 99 wt %.

In another embodiment, the dried product from step e is surface treated with an organosilane via controlled hydrolysis and condensation of the silane to the silica surface in an organic solvent, supercritical solvent, or solvent-free process.

Another methodology involves starting from an alkaline starting point.

In one embodiment, the method comprises forming a silica-based product comprising the steps of: a. providing a silica containing precursor (SCP) contained in solution that has a pH greater than 7; b. adjusting the pH of the solution to less than or equal to 7; c. optionally doping the SCP with one or more metal species, wherein said doping occurs when the solution has a pH less than or equal to a pH of 7; d. adjusting the pH of the solution to greater than 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: a functionalized metal oxide-doped or metal sulfide-doped silica product.

In another embodiment, the functional group in step g is an organosilane.

In another embodiment, the silicon-containing precursor is selected from at least one of the following: silicic acid, colloidal silica, tetraethylorthosilicate, alkaline silicates, and dispersed fumed silica.

In another embodiment, the pH of the silicon-containing precursor is adjusted through the use of at least one of the following: carbonic acid, an organic acid(s) such as but not limited to acetic acid, a mineral acid(s) such as but not limited to sulfuric acid and/or hydrochloric acid such that the pH is decreased to a range of from to 2 to 7.

In another embodiment, the pH range of the SCP is adjusted to a range of 3 to 4 with acetic acid.

In another embodiment, the pH of the SCP is adjusted to a pH range of 7 to 11 with the use of a chemistry selected from at least one of the following: ammonium hydroxide, ammonium carbonate, mineral bases, organic bases, alkaline silicates, sulfide salts, and polysulfide containing salts.

In another embodiment, the resulting slurry from step e is filtered and dried such that the solid concentration of said dried and filtered product is increased from about 5 wt % to about 99 wt %.

In another embodiment, the dried product from step f is surface treated with an organosilane via controlled hydrolysis and condensation of the silane to the silica surface in an organic solvent, supercritical solvent, or solvent-free process.

In another embodiment, the pH of the SCP is adjusted to greater than 7 by mixing said SCP with an alkaline solution at a shear rate of 6 to 23 m/s based on tip speed.

In another embodiment, the method further comprises adjusting the pH of the SCP to greater than 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than 7 by combining said SCP with an alkaline solution with mixing yielding a Reynolds Number greater than or equal to 2000, to form the silica based product.

In another embodiment, the method further comprises adjusting the pH of the SCP to greater than 7 by combining said SCP with an alkaline solution under transitional flow conditions, i.e. Reynolds Numbers between 2000 and 4000, to form the silica based product.

In another embodiment, the method further comprises adjusting the pH of the SCP to greater than 7 by combining said SCP with an alkaline solution under turbulent flow conditions, i.e. Reynolds Numbers greater than or equal to 4000, to form the silica based product.

The sulfur-based species of the present invention may be selected from a representative list but not intended to be a limiting list of at least one of the following: sulfide salts, dithiocarbamates, polymer-based dithiocarbamates, and polysulfide salts. Sulfide salts maybe but not limited to sodium sulfide, potassium sulfide, and/or metal sulfides such as copper sulfide. Dithiocarbamates may be but not limited to dimethyldithiocarbamate (DMDTC) or diethyldithiocarbamate (DEDTC). Polymer-based dithiocarbamates contain organic polymers containing the functional group $R_nCS_2$. wherein R is an alkyl group which is linear or branched. An example of a commercially available polymer-based dithiocarbamate is described in U.S. Pat. No. 5,164,095 and U.S. Pat. No. 5,346,627, which are herein incorporated by reference. Polysulfides that can be used in the present invention include, but are not limited to, sodium polysulfide and calcium polysulfide.

Organosilanes that can be used in the current invention are well known in the art and may be represented generally by $R_{(4-a)}$—$SiX_a$, wherein a may be from 1 to 3. The organofunctional group, R—, may be any aliphatic or alkene containing functionalized group such as propyl, butyl, 3-chloropropyl, amine, thiol, and combinations thereof X is representative of a hydrolysable alkoxy group, typically methoxy or ethoxy. Some examples are 3-thiopropyl and mercaptopropyl silanes.

During the preparation of the composition of this invention, salt is added to increase the conductivity of the reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

Thiols and amines are represented generally by the class of organic and inorganic compounds containing the amine or thiol group having the general formula —B—(SH) or —B—(NH$_2$), wherein B is a linear or branched group consisting of carbon atoms such as —(CH$_2$)$_n$—, wherein n is from 1 to 15, in particular where n is 1 to 6, and most preferred where n is 3.

EXAMPLE

Example 1

In this example, 2180 g of 7 wt % silicic acid was added to a heel containing 450 g deionized (DI) water and 150 g of silicic heated to 90° C. The silicic acid was fed at 10 ml/min for 3 h via a peristaltic pump into a 5 L reaction flask.

A solution containing 16.4 g of 25 wt % ammonia solution and 5.84 g ammonium carbonate was prepared in 24.6 g DI water. The solution was added to the reaction flask quickly whereupon the viscosity of the solution increased significantly. The mixture was stirred for 30 minutes, then any remaining silicic acid was fed at 20 ml/min. Upon completion of the silicic acid feed, the heating was turned off and the solution was allowed to cool.

The silica slurry was filtered and freeze-dried at 150° C. to produce a dry powder. Nitrogen sorption analysis of the powder was performed on an Autosorb-1C unit from Quantachrome. The sample was degassed at 300° C. for 2 h, then characterized by a multi-point BET surface area, total pore volume, and BJH (Barrett-Joyner-Halenda) adsorption pore size distribution. Physical data indicated a surface area of 354 square meters per gram, a pore volume of 1.19 cc/g, and a pore diameter of 13.5 nm.

Example 2

In this example, three solutions were prepared: A) 100 g Nalco N8691 silica sol, B) 3 g glacial acetic acid dissolved in 50 g DI water, and C) 2.7 g ammonium carbonate and 7.5 g 25 wt % ammonia dissolved in 150 g DI water. Solution B was added to solution A, followed by subsequent addition of solution C at a high shear rate. The mixture was stirred for 1-2 minutes before filtration. Nalco N8691 can be obtained from Nalco Company, 1601 West Diehl Road, Naperville, Ill. 60563.

The silica slurry was filtered and dried at 300° C. to produce a dry powder. Nitrogen sorption analysis was performed on an Autosorb-1C unit from Quantachrome. The sample was degassed at 300° C. for 2 h, then characterized by a multi-point BET surface area, total pore volume, and BJH adsorption pore size distribution. Nitrogen sorption analysis indicated a surface area of 240 square meters per gram, a pore volume of 0.57 cc/g, and a pore diameter of 9.6 nm.

Example 3

In this example, three solutions were prepared: A) 100 g Nalco N8691 silica sol, B) 3 g glacial acetic acid and 11.8 g polyaluminum chloride dissolved in 50 g DI water, and C) 15 g of 25 wt % ammonia dissolved in 150 g DI water. Solution B was added to solution A with mixing, followed by subsequent addition of solution C at a high shear rate. The mixture was stirred for 1-2 minutes before filtration.

The Al-doped silica slurry was filtered and dried at 300° C. to produce a dry powder, followed by nitrogen sorption analysis performed on an Autosorb-1C unit from Quantachrome. The sample was degassed at 300° C. for 2 h, then characterized by a multi-point BET surface area, total pore volume, and BJH adsorption pore size distribution. Nitrogen sorption analysis indicated a surface area of 469 square meters per gram, a pore volume of 0.82 cc/g, and a pore diameter of 7.0 nm.

Combinations of Components Described in Patent Application

In one embodiment, the composition of matter claims include various combinations of sorbent components and associated compositions, such molar ratios of constituent particles. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the sorbent components and associated compositions, such molar ratios of constituent particles. In a further embodiment, the claimed methods of use include combinations of the dependent claims. In a further embodiment, a range or equivalent thereof of a particular component shall include the individual component(s) within the range or ranges within the range.

In another embodiment, the method of manufacture claims include various combinations of the sorbent components and associated compositions, such pH control. In a further embodiment, the claimed methods of use include combinations of the dependent claims. In a further embodiment, a range or equivalent thereof of a particular component shall include the individual component(s) within the range or ranges within the range.

The invention claimed is:
1. A method of forming a silica-based product comprising:
    (a) providing a silica containing precursor (SCP) contained in solution that has a pH less than or equal to a pH of 7;
    (b) doping the SCP with one or more metal species, wherein said doping occurs when the solution has a pH less than or equal to a pH of 7;
    (c) adjusting the pH of the solution to greater than 7;
    (d) adding an effective amount of exogenous salt to the solution so that the conductivity of the solution is greater than or equal to 4 mS/cm, wherein said addition occurs after the pH adjustment in step 1c, wherein said addition results in a slurry of SCP;
    (e) optionally filtering and drying the SCP slurry; and
    (f) optionally reacting the dried product from step e with a functional group and optionally wherein the resultant functionalized dried product is at least one of the following; a functionalized metal oxide-doped or metal sulfide-doped silica product.
2. A method of forming a silica-based product comprising:
    (a) providing a silica containing precursor (SCP) contained in solution. that has a pH greater than 7;
    (b) adjusting the pH of the solution to less than or equal to 7;

(c) doping the SCP with one or more metal species, wherein said doping occurs when the solution has a pH less than or equal to a pH of 7;

(d) adjusting the pH of the solution. to greater than 7;

(e) adding an effective amount of exogenous salt to the solution so that the conductivity of the solution is greater than or equal to 4 mS/cm, wherein said addition occurs after the pH adjustment in step 2d, wherein said addition results in a slurry of SCP;

(f) optionally filtering and drying the SCP; and (g) optionally reacting the dried product from step f with a functional group and optionally wherein the resultant functionalized dried product is at least one of the following: a functionalized metal oxide-doped or metal sulfide-doped silica product.

3. The method of claim 1, wherein the functional group in step f is an organosilane.

4. The method of claim 2, wherein the functional group in step g is an organosilane.

5. The method of claim 1, wherein the silicon-containing precursor is at least one of the following: a silicic acid, colloidal silica, tetraethylorthosilicate, and dispersed fumed silica.

6. The method of claim 2, wherein the silicon-containing precursor is at least one of the following: silicic acid, colloidal silica, tetraethylorthosilicate, alkaline, silicates, and dispersed fumed silica.

7. The method of claim 2, wherein the pH of the silicon-containing precursor is adjusted through the use of at least one of the following: carbonic acid, organic acids, mineral acidssuch that the. pH is decreased to a range of from to 2 to 7.

8. The method of claim 1, wherein the pH range of the SCP in step 1(a) is from 3 to 4.

9. The method of claim 2, wherein, the pH range of the SCP is adjusted to a range from 3 to 4 with acetic acid.

10. The method of claim 1, wherein the metal-doped SCP is heated to a temperature range of from 25° C. to 95 ° C.

11. The method of claim 1, wherein the pH of the SCP is adjusted to a pH range from 7 to 11 with the use of a chemistry selected from at least one of the following: ammonium hydroxide, ammonium carbonate, mineral bases, organic bases, alkaline silicates, sulfide salts, organic dithiocarbamates, polymer-based dithiocarbamates, and polysulfide containing salts.

12. The method of claim 2, wherein. the pH of the SCP is adjusted to a pH range from 7 to 11 with the use of a chemistry selected from at least one of the following: ammonium hydroxide, ammonium carbonate, mineral bases, organic bases, alkaline silicates, sulfide salts, organic dithiocarbamates, polymer-based dithiocarbamates, and polysulfide containing salts.

13. The method of claim 1, wherein, the pH of the SCP is adjusted to greater than 7 by mixing said SCP with an alkaline solution at a shear rate of 6 to 23 m/s based on tip speed.

14. The method of claim 2, wherein the pH of the SCP is adjusted to greater than 7 by mixing said SCP with an alkaline, solution at a shear rate of 6 to 23 m/s based on tip speed.

15. The method of claim 1, wherein the resulting slurry from step d is filtered and dried such that the solid concentration of said dried and Filtered product is increased from about 5 wt % to about 99 wt %.

16. The method of claim 2, wherein the resulting slurry from step e is filtered and dried such that the solid concentration of said dried and filtered product is increased from about 5 wt % to about 99 wt %.

17. The method of claim 1, wherein the dried product from step e is surface treated with an organosilane via controlled hydrolysis and condensation of the silane to the silica surface in at least one of the following: organic solvent, supercritical solvent, and solvent-free process.

18. The method of claim 2, wherein the dried product from step f is surface treated with an organosilane via controlled hydrolysis and condensation of the silane to the silica surface in at least one of the following: organic solvent, supercritical solvent, and solvent-free process.

19. The method of claim 1, wherein the pH of the SCP is adjusted to greater than 7 by mixing said SCP with an alkaline solution via a mixing chamber; and optionally wherein the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber; and said mixing chamber can then be attached or in communication with a receptacle that holds/processes a mixed product resulting from said pH adjustment of said SCP.

20. The method of claim 2, wherein the pH of the SCP is adjusted to greater than 7 by mixing said SCP with an alkaline solution via a mixing chamber; and optionally wherein, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber; and said mixing chamber can then he attached or in communication with a receptacle that holds/processes a mixed product resulting from said pH adjustment of said SCP.

* * * * *

UNITED STATES PATENT AND TRADEMARK OFFICE
CERTIFICATE OF CORRECTION

PATENT NO. : 8,845,991 B2  Page 1 of 1
APPLICATION NO. : 12/756526
DATED : September 30, 2014
INVENTOR(S) : Bruce A. Kieser et al.

It is certified that error appears in the above-identified patent and that said Letters Patent is hereby corrected as shown below:

In the Claims

In column 6, claim 2, line 65, after "in solution" delete ".".

In column 7, claim 2, line 4, after "of the solution" delete ".".

In column 7, claim 7, line 31, replace "acidssuch that the. pH" with --acids such that the pH--.

In column 7, claim 9, line 36, after "to a range" replace "from3" with --from 3--.

In column 7, claim 12, line 46, after "wherein" delete ".".

Signed and Sealed this
Seventeenth Day of March, 2015

Michelle K. Lee
*Director of the United States Patent and Trademark Office*